(12) United States Patent
Light et al.

(10) Patent No.: US 7,597,755 B2
(45) Date of Patent: Oct. 6, 2009

(54) KAOLIN PIGMENT PRODUCTS

(75) Inventors: David L. Light, Cornwall (GB); Christopher R. L. Golley, Bugle St Austell Cornwall (GB); Ernest Gay, Macon, GA (US); Milton Constantin, Vila Cabanas Barcarena (BR)

(73) Assignee: Imerys Pigments, Inc., Roswell, GA (US)

( * ) Notice: Subject to any disclaimer, the term of this patent is extended or adjusted under 35 U.S.C. 154(b) by 277 days.

(21) Appl. No.: 10/518,338

(22) PCT Filed: Aug. 15, 2003

(86) PCT No.: PCT/US03/23267

§ 371 (c)(1),
(2), (4) Date: Sep. 9, 2005

(87) PCT Pub. No.: WO2004/016697

PCT Pub. Date: Feb. 26, 2004

(65) Prior Publication Data

US 2006/0096501 A1  May 11, 2006

(51) Int. Cl.
*C04B 14/04* (2006.01)
*C04B 14/00* (2006.01)
*D21H 11/00* (2006.01)
*D21H 13/00* (2006.01)
*D21H 15/00* (2006.01)
*D21H 17/00* (2006.01)
*D21H 19/00* (2006.01)
*D21H 21/00* (2006.01)
*D21H 23/00* (2006.01)

(52) U.S. Cl. .................. 106/486; 106/416; 106/484; 106/487; 162/181.8; 241/6

(58) Field of Classification Search ............ 106/484, 106/486, 487, 416; 162/181.8; 241/16, 6
See application file for complete search history.

(56) References Cited

U.S. PATENT DOCUMENTS

| | | | | |
|---|---|---|---|---|
| 5,089,056 | A * | 2/1992 | Shi et al. | 106/486 |
| 5,169,443 | A * | 12/1992 | Willis et al. | 106/486 |
| 6,003,795 | A * | 12/1999 | Bown et al. | 241/16 |
| 6,284,034 | B1 * | 9/2001 | Hiorns et al. | 106/486 |
| 6,402,826 | B1 * | 6/2002 | Yuan et al. | 106/486 |
| 2003/0177952 | A1 * | 9/2003 | Cummings et al. | 106/468 |
| 2004/0250973 | A1 * | 12/2004 | Johns et al. | 162/181.8 |

FOREIGN PATENT DOCUMENTS

| EP | 0 863 951 B1 | | 4/2002 |
|---|---|---|---|
| WO | WO 99/51815 | * | 10/1999 |
| WO | WO 00/32699 | * | 6/2000 |
| WO | WO 00/59840 | * | 10/2000 |
| WO | WO 00/66510 | | 11/2000 |
| WO | WO 02/16511 | * | 2/2002 |

* cited by examiner

*Primary Examiner*—Michael A Marcheschi
*Assistant Examiner*—Pegah Parvini
(74) *Attorney, Agent, or Firm*—Finnegan, Henderson, Farabow, Garrett & Dunner, L.L.P.

(57) ABSTRACT

A pigment product for use in a coating composition to provide a gloss coating on paper, the pigment product comprising a processed particulate kaolin having a particle size distribution such that at least about 80% by weight of the particles have an equivalent spherical diameter less than about 2 p,m and in the range of from about 10% to about 20% by weight of the particles have an equivalent spherical diameter less than about 0.25 wm, the particles have a shape factor in the range of from about 20 to about 36 and the particles have a particle steepness in the range of about greater than about 35, more preferably in the range of about 35 to about 40, and wherein the kaolin is derived from a secondary kaolin source.

25 Claims, No Drawings

KAOLIN PIGMENT PRODUCTS

FIELD OF THE INVENTION

The present invention relates to pigment products and their production and use in coating compositions. The present invention further relates to methods for making the pigment products and improved coated paper made using the pigment products.

The invention is concerned with the preparation of improved inorganic pigments for paper coating compositions, and, in particular, pigments for use in compositions for preparing gloss coated paper.

BACKGROUND OF THE INVENTION

Paper coating compositions are generally prepared by forming a fluid aqueous suspension of pigment material together with a hydrophilic adhesive and other optional ingredients. Lightweight coated, or LWC, paper is generally coated to a weight of from about 5 g.m$^{-2}$ to about 20 g.m$^{-2}$ on each side, and the total grammage, or weight per unit area of the coated paper is generally in the range of from about 49 g.m$^{-2}$ to about 70 g.m$^{-2}$. The coating may conveniently be applied by means of a coating machine including a short dwell time coating head, which is a device in which a captive pond of coating composition under a slightly elevated pressure is held in contact with a moving paper web for a time in the range of from 0.0004 second to 0.01 second, before excess coating composition is removed by means of a trailing blade. However, other types of coating apparatus may also be used for preparing lightweight coated paper. LWC paper is generally used for printing-magazines, catalogues and advertising or promotional material. The coated paper is required to meet certain standards of surface gloss and smoothness. For example, the paper may have a gloss value of at least about 32, ae.g. up to about 50, TAPPI units, and a Parker Print Surf value is generally in the range of from about 0.5 µm to about 1.6 µm.

Ultra lightweight coated, or ULWC, paper is sometimes otherwise known as light lightweight coated, or LLWC, paper and is used for catalogues and for advertising and promotional material sent through the mail to reduce mailing costs. The coating weight is generally in the range of from about 3 g.m$^{-2}$ to about 8 g.m$^{-2}$ per side. The total grammage is generally in the range of from about 30 g.m$^{-2}$ to about 48 g.m$^{-2}$.

An important white inorganic pigment for use in preparing coating compositions for the manufacture of LWC and ULWC papers is kaolin obtained from kaolin clay. Large deposits of kaolin clay exist in Devon and Cornwall, England and in the States of Georgia and South Carolina, United States of America. Important deposits also occur in Brazil, Australia, and in several other countries. Kaolin clay consists predominantly of the mineral kaolinite, together with small proportions of various impurities. Kaolinite exists in the form of hydrous aluminosilicate crystals in the shape of thin hexagonal plates, but these plates tend to adhere together face-to-face to form stacks or booklets. The individual plates may have mean diameters of 1 µm or less, but kaolinite particles in the form of booklets or stacks of plates may have an equivalent spherical diameter (esd) of up to 10 µm or more. Generally speaking, kaolin clay particles which have an equivalent spherical diameter of 2 µm or more are in the form of stacks of kaolinite plates, rather than individual plates. Additionally, in some secondary kaolin deposits smaller kaolin particles may sometimes adhere together in random orientations to form agglomerated particles having equivalent spherical diameters significantly greater than 2 µm.

The kaolin deposits in England differ from those in the United States of America and Brazil in that the English deposits are of primary kaolin, while those in the USA and Brazil are of the sedimentary or secondary type. Kaolin was formed in geological times by the hydrothermal decomposition of the feldspar component of granite, and primary kaolin is that which is obtained directly from the granite matrix in which it was originally formed. On the other hand, secondary or (tertiary) kaolin also known as sedimentary kaolin has been washed out of the original granite matrix in geological times and has been deposited in an area remote from the site in which it was originally formed. Secondary kaolin deposits tend to have a higher proportion of fine particles, i.e., those having an esd smaller than about 2 µm, because the kaolin has undergone a certain amount of natural grinding during the course of its transport from its site of origin to its site of final deposition. See, for example, Jepson (Jepson, W. B., "Kaolins: their properties and uses", *Phil Trans R Soc Lond*, A311, 1984, pp 411-432). Secondary kaolins also tend to be more blocky than primary kaolins, containing large numbers of both kaolin stacks and agglomerates of smaller blocky kaolin particles.

As long ago as 1939, Maloney disclosed in U.S. Pat. No. 2,158,987 that the finish, or gloss, of a clay coated paper is greatly improved if the clay, before incorporation in the coating composition, is treated so that a large percentage, for example 80% by weight or more, of the clay particles have a size in the range of 0.1 µm to 2 µm. In order to increase the proportion of fine particles in the raw kaolin, the raw kaolin may, according to the disclosure in U.S. Pat. No. 2,158,987, be subjected, before a centrifuging step, to a grinding operation in which a suspension containing from about 50% to about 75% by dry weight of kaolin and a dispersing agent is subjected to pebble milling. When the kaolin from the finer fraction is recovered, mixed with a suitable paper coating binder, and applied to the surface of a base paper, a coating of good gloss and color is obtained.

Various pigment products which are made using the principles described by Maloney in U.S. Pat. No. 2,158,987 are commercially available and provide good gloss and smoothness in coated papers, especially for LWC and ULWC paper. For example, a known pigment product available from Imerys, Inc., and recommended for gloss coatings of LWC comprises a refined English kaolin product having a particle size distribution, "psd", such that 89% by weight of the particles have an esd less than 2 µm, 74% by weight of the particles have an esd less than 1 µm and 25% by weight of the particles have an esd less than 0.25 µm.

One particularly useful kaolin pigment product which is commercially available fromImerys, Inc. for use in gloss papers is marketed under the tradename of 'SUPRAPRINT™'. SUPRAPRINT™ is derived from a coarse, primary English clay and generally has a particle size distribution such that about 90% by weight of the kaolin particles therein have an esd less that about 2 microns and about 12-16% by weight of the particles have an esd less than about 0.25 microns. Further defining characteristics of the SUPRAPRINT™ kaolin include its shape factor in the range of 30-35, and its particle steepness of approximately 40. Due to its high steepness and shape factor and resultant particle packing effects, the opacity and gloss of SUPRAPRINT™ have proven particularly suited for use in gloss paper coatings and the like.

SUPRAPRINT™ is produced by from a Cornish primary clay having naturally platy fines-via the steps of: (1) pressing and pugging; (2) makedown into a slurry; (3) mild grinding to partially delaminate a portion of the kaolin stacks present; (4) fractionation using a decanter centrifuge; and a series of beneficiation and finishing steps. A portion of the coarse fraction from step 4 is sometimes recycled to grinding step 3 in an effort to maximize the yield of the process, but is not required to obtain product having the desired parameters. Though overall coarse in nature, the primary Cornish clay used has a high concentration of ultrafine platy particles which undesirably decrease the yield and increase the amount of waste material that must be disposed of from the production process. Accordingly, production of the SUPRA-PRINT™ product from coarse primary deposit of English kaolin has proven to be undesirably costly.

It would clearly be desirable to provide for the production of a pigment product having similar parameters from a cheaper and easier to process secondary kaolin deposit that has a much lower quantity of ultrafine platy particles, such as can be found in the Rio Capim region of Brazil. Due to the inherently blocky nature of such secondary kaolins the required processing would likely need to differ significantly from that used to produce such a product from a more platy and coarse primary kaolin. Specifically, one might increase the shape factor of a blocky secondary kaolin through a harsher delamination that is typically used for the naturally platy primary kaolins. However, due to the presence of agglomerates of blocky kaolin particles in such secondary kaolins, one of ordinary skill in the art would expect typical delamination methods to also result in an undesirable decrease in shape factor as the agglomerates break up into fine blocky particles instead of delaminating.

We have now developed an improved kaolin pigment product and method of production thereof that addresses these shortcomings of the prior art. The present invention provides a pigment product having the desired gloss and/or brightness, particularly, but which can be easily and inexpensively produced from a secondary kaolin deposit. In addition, the pigment product of the present invention may result in a reduction of the conventional amount of alternate pigments, for example, titanium dioxide, that would be have to be used.

SUMMARY OF THE INVENTION

According to a first aspect of the present invention there is provided a pigment product for use in a coating composition to provide a gloss coating on paper, the pigment product comprising a processed particulate kaolin having a particle size distribution such that at least about 85% by weight of the particles have an equivalent spherical diameter less than 2 µm, and from about 15% to about 20% by weight of the particles have an equivalent spherical diameter less than 0.25 µm, the particles have a shape factor in the range of from about 20 to about 40, and the particles have a particle steepness (d30/d70×100) in the range of about 32 to about 40, and wherein said pigment product is derived from a crude kaolin obtained from a secondary kaolin deposit, such as for example the secondary kaolin deposits found in the Rio Capim region of Brazil.

Surprisingly and beneficially, a pigment product according to the first aspect of the invention can be produced easily and inexpensively from a fine secondary kaolin while still providing improved gloss, brightness and/or opacity when incorporated in a coating composition without undesirably increasing the presence of fine kaolin particles. Alternatively, the pigment product according to the first aspect of the invention can retain the gloss, brightness, and/or opacity characteristics associated with prior products while naturally reducing the amounts of expensive alternate pigments, e.g., titanium dioxide, that must be used, i.e., the same grade of coated paper may be produced at reduced cost.

The pigment product according to the first aspect of the invention has an unexpected combination of properties which are not normally obtained by conventional processing of secondary kaolin clays.

The following detailed description illustrates exemplary embodiments of several aspects of the invention and serves merely to explain the principles of the invention rather than to cover every possible embodiment thereof.

DESCRIPTION OF THE INVENTION

The pigment product according to the first aspect of the present invention may be produced by treating and blending particulate hydrous kaolin minerals of the secondary (aka sedimentary) type, more particularly raw or (partially) processed kaolin clays of a type that can be obtained from certain deposits in the Para State of Brazil such as, for example, the Rio Capim watershed.

The pigment product according to the first aspect of the invention may have a particle size distribution, 'psd', such that in the range of from about 85% to about 95% by weight of the particles have an equivalent spherical diameter, 'esd', less than about 2 µm. In another embodiment, the range of from about 87% to about 93% by weight of the particles have an esd less than about 2 µm. In yet another embodiment, the range of from about 89% to about 91% by weight of the particles have an esd less than about 2 µm. According to one embodiment of the present invention, the range of from about 15% to about 20% by weight of the particles have an esd less than about 0.25 µm. In yet another embodiment, the range of from about 16% to about 18% by weight of the particles have an esd less than about 0.25 µm.

As will be appreciated by those skilled in the art, the psd of a particulate product such as the pigment product according to the present invention may be determined by measuring the sedimentation speeds of the dispersed particles of the particulate product under test through a standard dilute aqueous suspension using a SEDIGRAPH™ machine, e.g., SEDIGRAPH 5100, obtained from Micromeritics Corporation, USA. The size of a given particle is expressed in terms of the diameter of a sphere of equivalent diameter, which sediments through the suspension, i.e., an equivalent spherical diameter or esd, the parameter as referred to above. The SEDIGRAPH machine graphically records the percentage by weight of particles having esd less than a certain esd value versus esd.

A kaolin product of high shape factor is considered to be more "platy" than a kaolin product of low shape factor. "Shape factor" as used herein is a measure of an average value (on a weight average basis) of the ratio of mean particle diameter to particle thickness for a population of particles of varying size and shape as measured using the electrical conductivity method and apparatus described in GB-A-2240398/U.S. Pat. No. 5,128,606/EP-A-0528078, which are incorporated herein by reference in their entirety, and using the equations derived in these patent specifications. "Mean particle diameter" is defined as the diameter of a circle which has the same area as the largest face of the particle. In the measurement method described in EP-A-0528078 the electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and using the difference between the two conductivity measurements, the shape factor of the particulate material under test is determined.

According to the first aspect of the invention, the pigment product of the present invention comprises particles having a shape factor in the range of from about 20 to about 40, for example from about 20 to about 36. In another embodiment according to the present invention, the shape factor may be in the range of from about 23 to about 33. In still another embodiment, the shape factor may be in the range of from about 25 to about 29. In another embodiment, the shape factor is in the range of from about 26 to 28.

Additionally, in accordance with the above described embodiments of the first aspect of the present invention, the pigment particles may have a particle steepness (d30/d70× 100, where d30 is the particle diameter measured by the SediGraph instrument at 30% weight passing below the diameter and where d70 is the particle diameter measured at 70% weight passing below the diameter) of greater than 32, for example greater than 35. Alternatively, the particles may have a more narrow particle steepness of between 32 and 40, between 35 and 40, between 36 and 39, or even of about 38.

According to the present invention in a second-aspect there is provided a method for producing a pigment product according to the first aspect, the method comprising the steps of:
(a) mixing a raw or partially processed kaolin clay with water to form an aqueous suspension;
(b) blending said aqueous suspension with a coarse kaolin to form a blended kaolin suspension comprising kaolin particles that include no more than about 60% by weight particles having an esd less than 2 microns;
(c) subjecting the blended kaolin suspension produced by step (b) to attrition grinding using a particulate grinding medium by a process in which the average shape factor of the kaolin is increased by, for example, at least about 10 to at least about 15;
(d) separating the suspension of ground kaolin from the particulate grinding medium; and
(e) fractionating the suspension of ground kaolin separated in step (d) to recover a kaolin pigment having a desired particle size distribution therefrom.

In step (a) of the method according to the second aspect of the present invention, the kaolin clay may form from 20% to 70%, usually from 20% to 45% of the treated suspension. The kaolin clay preferably comprises a secondary (aka sedimentary) kaolin clay, such as a secondary kaolin clay from the Para State region of Brazil, e.g. from the Rio Capim watershed region. The raw kaolin clay may be a fine kaolin having a psd such that not more than about 40% by weight comprising particles having an esd larger than 1 0pn and not more than 75% by weight, e.g. from about 50% to about 70% by weight, consists of particles having an esd smaller than 2 µm. The shape factor of the kaolin clay treated in step (a) may be less than 15, e.g. in the range of from about 5 to about 12.

In step (b) the psd of the kaolin clay may be adjusted so that it is in accordance with the first aspect of the invention by blending from 90 to 20 parts by weight of degritted (substantially all particles greater than 45 microns are removed by hydrocyclones, dragboxes and/or screens)—unfractionated (not centrifuged except for the purpose of scalping to remove substantially all particles greater than 45 micron) kaolin clay with from 10 to 80 parts by weight, for example from 40 to 60 parts by weight, of at least one fractionated coarse kaolin component, for example a coarse fraction from a centrifugal classification step of a related or unrelated kaolin product. The coarse fraction may be derived from a kaolin which has been previously subjected to attrition grinding, magnetic separation and size classification steps. An exemplary coarse fraction may, for example have a shape factor ranging from about 5 to about 55, for example from about 10 to about 30, or even from about 10 to about 12, and a percentage by weight of particles smaller than 2 µm ranging from about 20% to about 40%, for example from about 25 to about 35%, or even from about 30% to about 35%. The addition may be carried out with the kaolin to be blended in either powdered, dry form or in the form of an aqueous suspension. In one exemplary embodiment, the coarse fractions are routed directly from one or more centrifugal classifiers to a blend tank for mixture with a crude kaolin suspension that has been previously subjected to degritting, a low energy scrub grind in an stirred media mill or attrition grinder, and magnetic separation.

We have found that by producing a kaolin product by blending in the manner described, the rheology and dewatering characteristics of an aqueous suspension of the kaolin processed in accordance with the method of the second aspect are improved, giving better runnability and particle alignment when the kaolin is used in a coating composition as described later. Thus, it may in some instances be advantageous to more precisely control the characteristics of the blended kaolin by adding more precisely metered amounts of the one or more coarse kaolin being added to the blend tank. This can easily be accomplished by diverting the centrifuge coarse fractions into intermediate storage tanks from which the rate of addition may be more easily metered.

While not intending to be bound by any one theory, it is our hypothesis that the coarse fractions used in the exemplary embodiments of the present invention are particularly suited for later delamination because they are enriched in coarse kaolin particles comprising kaolin booklets. At least in the exemplary embodiments, the coarse kaolin may be derived by the size classification of pre-ground kaolin. We hypothesise that a disproportionate number of the coarse particles broken up by the initial grinding comprise aggregates of smaller blocky kaolin particles and that the kaolin booklets present are largely not delaminated in the initial grinding step. Thus, by first grinding and size classifying to obtain the coarse kaolin used in the exemplary embodiments of the present invention, it may be possible to effectively enrich the number of kaolin booklets suitable for delamination, thereby increasing the shape factor of the resultant product.

The kaolin clay treated in the method according to the second aspect of the invention may be subjected to one or more well known purification steps to remove undesirable impurities, e.g. between steps (a) and (c). For example, the aqueous suspension of kaolin clay may be subjected to a froth flotation treatment operation to remove titanium containing impurities in the froth. Alternatively, or in addition, the suspension may be passed through a high intensity magnetic separator to remove iron containing impurities.

Step (c) may comprise a process wherein the suspension of kaolin clay is treated by medium attrition grinding wherein an energy of from about 40 kWh to about 250 kWh per tonne of clay (on a dry weight basis) is dissipated in the suspension. The attrition grinding can be carried out in one grinding stage or in multiple grinding stages. In one embodiment of the present invention, the attrition grinding has been achieved using an attrition scrubber, such as the Floatex Attrition Scrubber available from the Carpco Division of Outokumpu Technology, Inc. This attrition grinding step has the general result of increasing the average shape factor of the kaolin due to delamination of the kaolin books and stacks present in the suspension. The particulate grinding medium is suitably of relatively high specific gravity, for example 2 or more, and may for example comprise grains of silica sand, the grains generally having diameters not larger than about 2mm and not smaller than about 0.25 mm. Suitably, attrition grinding step (c) will be sufficient to increase the shape factor of the kaolin clay by at least about 10, for example by at least about 15.

In step (d) of the method according to the second aspect of the invention, the suspension of ground kaolin clay may be conveniently separated from the particulate grinding medium in a known manner, e.g. by passing the suspension through a sieve of appropriate aperture size, for example a sieve having nominal aperture sizes in the range of from about 0.1 mm to about 0.25 mm.

In step (e) of the method according to the second aspect of the invention, the suspension of ground kaolin clay may be fractionated based upon particle size into coarse and fine fractions. Fractionation (or classification) may be accomplished using any known or after-discovered method. Appropriate methods include gravity sedimentation or elutriation, any type of hydrocyclone apparatus, or, suitably, a solid bowl decanter centrifuge, disc nozzle centrifuge, or the like. The resultant coarse fraction may be discarded, used as a separate product or may be directed back to the blend tank as an auxiliary source for the coarse kaolin used in the method of the present invention. The coarse fraction may suitably have a psd such that no more than about 60% by weight of the particles therein have an esd of less than 2 microns and may have a shape factor of at least about 40.

Following step (e) of the method according to the second aspect of the invention, the resultant fine fraction of suspended kaolin may comprise the kaolin composition of the first aspect of the invention. The fine fraction of suspended kaolin may optionally be subjected to a conventional leaching (or bleaching) step that should be familiar to those of ordinary skill in the art. Specifically, a reductive leaching agent such as sodium hydrosulfite may be added in a dose range of, for example, about 0.5 to 5.0 pounds per ton of kaolin, with certain embodiments containing less than about 4 pounds per ton on a dry basis. Other suitable reductive bleaching agents, such as formamidine sulphonic acid, may also be employed. Reductive bleaching using sodium hydrosulfite is suitably carried out at an acidic pH,-typically in the range of 2.0 to 4.0.

The fine fraction of suspended ground kaolin may also optionally be dewatered in one of the ways well known in the art, e.g. filtration, centrifugation, evaporation and the like. In one aspect, a filter press is used to dewater the suspended ground kaolin to produce a filter cake. The filter cake may be mixed with a dispersing agent for the kaolin clay and thus converted into a fluid slurry which may be transported and sold in this form. Alternatively, the kaolin clay may be thermally dried, for example by introducing the fluid slurry of the kaolin clay into a spray drier and thereby transported in a substantially dry form.

Following step (d) or step (e) the kaolin clay may be further treated to improve one or more of its properties. For example high energy liquid working, e.g. using a high speed mixer, may be applied to the product in slurry form, e.g. before step (e) or after step (e) and subsequent re-dispersion in an aqueous medium, e.g. during makedown of a coating composition.

Use of the pigment product provided by the invention in a paper coating composition may advantageously result in a reduction of the conventional amount of titanium dioxide pigment and plastic pigment (hollow core and solid core) which would typically be used in a paper coating composition, such as up to about 4 parts by weight of each pigment based on the weight of the pigment product. Titanium dioxide and plastic pigment are relatively expensive pigments and the latter pigment may cause undesirable viscosity problems in coating compositions.

The pigment product according to the first aspect of the present invention may be used in paper coating as follows.

According to the present invention in a third aspect there is provided a coating composition for use in producing gloss coatings on paper and other substrates which composition comprises an aqueous suspension of a particulate pigment and a hydrophilic adhesive or binder, wherein the particulate pigment comprises the pigment in accordance with the first aspect of the invention. In this specification, the expression 'paper' embraces products which are of paper, board, card and the like.

The solids content of the paper coating composition according to the third aspect of the invention may be greater than about 60% by weight, e.g. at least 70%. The composition may include a dispersing agent, e.g., up to about 2% by weight of a polyelectrolyte based on the dry weight of pigment present. For example, polyacrylates and copolymers containing polyacrylate units are well known as suitable polyelectrolytes. The pigment product according to the first aspect of the invention may be used as the sole pigment in the paper coating composition according to the third aspect, or it may be used in conjunction with one or more other known pigments, such as for example, (commercially available) kaolin, calcined kaolin, natural or precipitated calcium carbonate, titanium dioxide, calcium sulphate, satin white, talc and so called 'plastic pigment'. When a mixture of pigments is used the pigment product according to the first aspect of the invention is suitably present in the mixture in an amount of at least about 80% of the total dry weight of the mixed pigments.

The binder of the composition according to the third aspect may comprise an adhesive derived from natural starch obtained from a known plant source, for example, wheat, maize, potato or tapioca, although it is not essential to use starch as a binder ingredient. Other binders, which may be used with or without starch, are mentioned later.

Where starch is employed as a binder ingredient, the starch may be unmodified or raw starch, or it may be modified by one or more chemical treatments known in the art. The starch may, for example, be oxidized to convert some of its —$CH_2OH$ groups to —COOH groups. In some cases the starch may have a small proportion of acetyl-$COCH_3$, groups. Alternatively, the starch may be chemically treated to render it cationic or amphoteric, i.e., with both cationic and anionic charges. The starch may also be converted to a starch ether, or hydroxyalkylated starch by replacing some —OH groups with, for example, —O—$CH_2$—$CH_2OH$ groups, —O—$CH_2$—$CH_3$ groups or —O—$CH_2$—$CH_2$—$CH_2OH$ groups. A further class of chemically treated starches which may be used are those known as the starch phosphates. Alternatively, the raw starch may be hydrolyzed by means of a dilute acid or an enzyme to produce a gum of the dextrin type. The amount of the starch binder used in the composition according to the third aspect may range from, for example, about 2% to about 25% by weight, based on the dry weight of pigment. The starch binder may be used in conjunction with one or more other binders, for example synthetic binders of the latex or polyvinyl acetate or polyvinyl alcohol type. When the starch binder is used in conjunction with another binder, e.g., a synthetic binder, the amount of the starch binder may range from, for example, about 2% to about 20% by weight, and the amount of the synthetic binder from about 2% to about 12% by weight, both based on the weight of dry pigment. In one embodiment, at least about 50% by weight of the binder mixture comprises modified or unmodified starch.

According to the present invention in a fourth aspect there is provided a method of use of the coating composition according to the third aspect which comprises applying the composition to coat a sheet of paper and calendering the paper to form a gloss coating thereon. In some embodiments, the gloss coating is formed on both sides of the paper.

Calendering is a well known process in which paper smoothness and gloss is improved and bulk is reduced by passing a coated paper sheet between calender nips or rollers one or more times. Usually, elastomer coated rolls are employed to give pressing of high solids compositions. An elevated temperature may be applied. Five or more passes through the nips may be applied.

The paper after coating and calendering in the method according to the fourth aspect may have a total weight per unit area in the range about 30 $g.m^{-2}$ to about 70 $g.m^{-2}$. In another embodiment the total weight per unit is in the range about 49 $g.m^{-2}$ to about 65 $g.m^{-2}$ or about 35 $g.m^{-2}$ to about 48 $g.m^{-2}$. The final coating may have a weight per unit area of from about 3 $g.m^{-2}$ to about 20 $g.m^{-2}$. In yet another embodiment the final coating weight is from about 5 $g.m^{-2}$ to about 13 $g.m^{-2}$ for LWC and about 4 $g.m^{-2}$ to about 8 $g.m^{-2}$ for ULWC. Such a coating may be applied to both sides of the paper. Thus, the coated paper may be LWC or ULWC paper. The paper gloss may be greater than about 45 TAPPI units and the Parker Print Surf value at a pressure of 1 MPa of each paper coating may be less than about 1 µm.

The gloss of a coated paper surface may be measured by means of a test laid down in TAPPI Standard No 480 ts-65. The intensity of light reflected at an angle from the surface of the paper is measured and compared with a standard of known gloss value. The beams of incident and reflected light are both at an angle of 75° to the normal to the paper surface. The results are expressed in TAPPI gloss units. The gloss of the pigment product according to the first aspect may be greater than about 50, in some cases greater than about 55, TAPPI units.

The Parker Print Surf test provides a measure of the smoothness of a paper surface, and comprises measuring the rate at which air under pressure leaks from a sample of the coated paper which is clamped, under a known standard force, between an upper plate which incorporates an outlet for the compressed air and a lower plate, the upper surface of which is covered with a sheet of either a soft or a hard reference supporting material according to the nature of the paper under test. From the rate of escape of the air, a root mean cube gap in µm between the paper surface and the reference material is calculated. A smaller value of this gap represents a higher degree of smoothness of the surface of the paper under test.

An improvement is provided by the present invention where the binder present in the coating composition according to the third aspect comprises starch. However, an improvement is also obtained where other known starch-free binders are employed (with or without starch present). In each case the adhesive or binder may form from about 4% to about 30% by weight of the solids content of the composition. In another embodiment, the adhesive or binder may be from about 8% to about 20% by weight of the solids content of the composition. In yet another embodiment, the adhesive or binder may be from about 8% to about 15% by weight of the solids content of the composition. The amount employed will depend upon the composition and the type of adhesive, which may itself incorporate one or more ingredients. For example, hydrophilic adhesives used in the art, e.g., incorporating one or more of the following adhesive or binder ingredients may be used in the following stated amounts:

(a) latex: levels range from about 4% by weight to about 20% by weight. The latex may comprise, for example, a styrene butadiene, acrylic latex, vinyl acetate latex, or styrene acrylic copolymers.

(b) other binders: levels range from, for example about 4% by weight to about 20% by weight. Examples of other binders include casein, polyvinyl alcohol and polyvinyl acetate.

Additives in various known classes may, depending upon the type of coating and the material to be coated, be included in the coating composition according to the third aspect of the present invention. Examples of such classes of optional additive are as follows:

(a) cross linkers: e.g., in levels of up to about 5% by weight; for example glyoxals, melamine formaldehyde resins, ammonium zirconium carbonates.

(b) water retention aids: e.g., in up to about 2% by weight, for example, sodium carboxymethyl cellulose, hydroxyethyl cellulose, PVA (polyvinyl acetate), starches, proteins, polyacrylates, gums, alginates, polyacrylamide bentonite and other commercially available products sold for such applications.

(c) viscosity modifiers or thickeners: e.g., in levels up to about 2% by weight; for example, polyacrylates, emulsion copolymers, dicyanamide, triols, polyoxyethylene ether, urea, sulphated castor oil, polyvinyl pyrrolidone, montmorillonite, CMC (carboxymethyl celluloses), sodium alginate, xanthan gum, sodium silicate, acrylic acid copolymers, HMC (hydroxymethyl celluloses), HEC (hydroxyethyl celluloses) and others.

(d) lubricity/calendering aids: e.g., in levels up to about 2% by weight, for example, calcium stearate, ammonium stearate, zinc stearate, wax emulsions, waxes, alkyl ketene dimer, glycols.

(e) dispersants: e.g., in levels up to about 2% by weight, for example, polyelectrolytes such as polyacrylates and copolymers containing polyacrylate species, more particularly, polyacrylate salts (e.g., sodium and aluminium optionally with a group II metal salt), sodium hexametaphosphates, non-ionic polyol, polyphosphoric acid, condensed sodium phosphate, non-ionic surfactants, alkanolamine and other reagents commonly used for this function.

(f) antifoamers/defoamers: e.g., in levels up to about 1% by weight, for example, blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

(g) dry or wet pick improvement additives: e.g., in levels up to about 2% by weight, for example, melamine resin, polyethylene emulsions, urea formaldehyde, melamine formaldehyde, polyamide, calcium stearate, styrene maleic anhydride and others.

(h) dry or wet rub improvement and abrasion resistance additives: e.g., in levels up to about 2% by weight, for example, glyoxal based resins, oxidized polyethylenes, melamine resins, urea formaldehyde, melamine formaldehyde, polyethylene wax, calcium stearate and others.

(i) gloss-ink hold-out additives: e.g., in levels up to about 2% by weight, for example, oxidized polyethylenes, polyethylene emulsions, waxes, casein, guar gum, CMC, HMC, calcium stearate, ammonium stearate, sodium alginate and others.

(j) optical brightening agents (OBA) and fluorescent whitening agents (FWA): e.g., in levels up to about 1% by weight, for example stilbene derivatives.

(k) dyes: e.g., in levels up to about 0.5% by weight.

(l) biocides/spoilage control agents: e.g. in levels up to 1% by weight, for example, metaborate, sodium dodecylbenzene sulphonate, thiocyanate, organosulphur, sodium benzonate and other compounds sold commercially for this function.

(m) leveling and evening aids: e.g., in levels up to about 2% by weight, for example, non-ionic polyol, polyethylene emulsions, fatty acid, esters and alcohol derivatives, alcohol/ethylene oxide, sodium CMC, HEC, alginates, calcium stearate and other compounds sold commercially for this function.

(n) grease and oil resistance additives: e.g., in levels up to about 2% by weight, e.g., oxidized polyethylenes, latex, SMA (styrene maleic anhydride), polyamide, waxes, alginate, protein, CMC, HMC.

(o) water resistance additives: e.g., in levels up to about 2% by weight, e.g., oxidized polyethylenes, ketone resin, anionic latex, polyurethane, SMA, glyoxal, melamine resin, urea formaldehyde, melamine formaldehyde, polyamide, glyoxals, stearates and other materials commercially available for this function.

(p) insolubilizer: e.g., in levels up to about 2% by weight.

For all of the above additives, the percentages by weight quoted are based on the dry weight of pigment (100%) present in the composition. Where the additive is present in a minimum amount the minimum amount may be 0.01% by weight based on the dry weight of pigment.

The method according to the fourth aspect of the present invention may be carried out in a known way which will depend upon the material to be coated, the coating composition to be applied and other factors as determined by the operator, e.g., speed and ease of runnability e.g., using a conventional coating machine.

Methods of coating paper and other sheet materials are widely published and well known. For example, there is a review of such methods published in Pulp and Paper International, May 1994, page 18 et seq. Sheets may be coated on the sheet forming machine, i.e., "on-machine", or "off-machine" on a coater or coating machine. Use of high solids compositions is desirable in the coating method because it leaves less water to evaporate subsequently. However, as is well known in the art, the solids level should not be so high that high viscosity and leveling problems are introduced.

According to the fourth aspect of the present invention a paper coating method may include: (i) a means of applying the coating composition to the material to be coated, viz., an applicator; and (ii) a means for ensuring that a correct level of coating composition is applied, viz., a metering device. When an excess of coating composition is applied to the applicator, the metering device is downstream of it. Alternatively, the correct amount of coating composition may be applied to the applicator by the metering device, e.g., as a film press. At the points of coating application and metering, the paper web support ranges from a backing roll, e.g., via one or two applicators, to nothing i.e., just tension. The time the coating is in contact with the paper before the excess is finally removed is the dwell time—and this may be short, long or variable.

The coating is usually added by a coating head at a coating station. According to the quality desired, paper grades are uncoated, single coated, double coated and even triple coated. When providing more than one coat, the initial coat (precoat) may have a cheaper formulation and optionally less pigment in the coating composition. A coater that is applying a double coating, i.e., a coating on each side of the paper, will have two or four coating heads, depending on the number of sides coated by each head. Most coating heads coat only one side at a time, but some roll coaters (e.g., film press, gate roll, size press) coat both sides in one pass.

Examples of known coaters which may be employed include air knife coaters, blade coaters, rod coaters, bar coaters, multi-head coaters, roll coaters, roll/blade coaters, cast coaters, laboratory coaters, gravure coaters, kiss coaters, liquid application systems, reverse roll coaters and extrusion coaters.

In all examples of coating compositions described in this specification, water is added to the solids to give a concentration of solids which when coated onto a sheet to a desired target coat weight has a rheology suitable for the composition to be coated with a pressure (e.g., a blade pressure) of between about 1 and about 1.5 bar. Generally, the solids content may be from about 60% to about 70% by weight.

Embodiments of the present invention will now be described by way of example only with reference to the following illustrative Examples.

EXAMPLE 1

Preparation

A raw kaolin clay from a sedimentary deposit in the Rio Capim region of Brazil was suspended in water, blunged at 40% to 45% solids, degritted and scrub ground according to conventional methods that would be familiar to one of ordinary skill in the art. The resultant suspension was passed through a high intensity magnetic separator to remove iron-containing impurities therefrom. After the magnetic separation step the kaolin clay was found to have a psd such that 68% by weight consisted of particles having an esd smaller than 2 µm. The shape factor of the kaolin clay as measured by the method described in GB-A-2240398 was found to be about 11.

A first portion of the magnetted crude kaolin suspension was directed to a Floatex Attrition Scrubber (available from the Carpco Division of Outokumpu Technology, Inc.) and ground for a time such that approximately 50 kWh of energy was dissipated per tonne of kaolin clay. The grinding medium was a silica sand having grains in the size range from about 0.6 mm to about 0.85 mm. At the completion of this grinding step, the kaolin clay was found to have a psd such that 70-75% by weight consisted of particles having an esd smaller than 2 μm. The mean particle shape factor as measured by the method described in GBA-2240398 was found to be 38-42.

The sandgrinder product had a psd such that approximately 70-75% by weight of the particles therein had an esd less than about 2 microns, and a shape factor in the range of 38-40.

The suspension of ground kaolin clay was separated from the grinding medium by elutriation to recover a delaminated kaolin stream. This delaminated kaolin stream was then directed to a Bird-type centrifuge and separated into coarse and fine fractions. The resultant fine fraction was used as an end product unrelated to the kaolins of the present invention. The resultant coarse fraction consisted of a kaolin suspension having approximately 34% of particles by weight less than 2 microns and a shape factor of approximately 12. It also is hypothesized that this coarse fraction was enriched in kaolin booklets and stacks as previously discussed. The coarse fraction was directed to the blend tank for mixing with a second portion of the magnetted crude in a ratio of about 20% magnetted crude to about 80% coarse kaolin suspension to form a blended kaolin suspension.

The overflow product from the centrifuge was then acidified with sulphuric acid, bleached with 3 kg of sodium dithionite bleaching reagent per tonne of dry kaolin, dewatered in a filterpress, and the cake thus formed was redispersed with the aid of 0.25% by weight, based on the weight of dry kaolin, of a sodium polyacrylate dispersing agent. The dispersed suspension was then spray dried to form a dry powder.

The final kaolin clay product had a psd such that 89-92% by weight consisted of particles having an esd smaller than 2 μm, and about 15-19% by weight consisted of particles having an esd smaller than 0.25 μm. The shape factor of the product as measured by the method described in GB-A-2240398 was found to be greater than 26 (up to about 35, depending on the particular batch tested). The particle steepness of the product was approximately in the range of about 35 to about 40.

This product was identified as kaolin compositions A1 through A3 which respectively reflect different batches of product produced by the above detailed method.

EXAMPLE 2

Kaolin Properties

The brightness (ISO), yellowness, particle size distribution, shape factor and viscosity concentrations of kaolin compositions A1-A3 are compared in Table 1 to those of the prior art composition SUPRAPRINT™.

TABLE 1

Kaolin Properties

| Pigment | Brightness (ISO) | Y'ness | <2 μm (%) | <1 μm (%) | <0.5 μm (%) | <0.25 μm (%) | Shape Factor | Viscosity Concentration (%) |
|---|---|---|---|---|---|---|---|---|
| SUPRAPRINT ™ | 88.4 | 3.6 | 92 | 71 | 38 | 15 | 35 | 70 |
| Composition A3 (Invention) | 89.1 | 4.4 | 92 | 72 | 45 | 19 | 26 | 72.3 |
| Composition A3 (Invention) | 88.6 | 4.7 | 89 | 66 | 39 | 17 | 31 | 71.9 |
| Composition A3 (Invention) | 89.4 | 4.3 | 90 | 67 | 40 | 16 | 32 | 71.7 |

As can be seen in Table 1, the secondary kaolins prepared in accordance with aspects of the present invention have properties that are overall close to the desired properties of the prior art primary kaolin. While the inventive kaolins do have a somewhat lower shape factor and a slightly more yellow tint that the prior art primary kaolin, they have a comparable psd and superior brightness and viscosity concentrations. Brightness is defined as the percentage reflectance to light of wavelength 457 nm as measured in accordance with International Standard No ISO 2470 and powder yellowness is defined as the difference between the percentage reflectance of the powder to light of wavelength 457 nm and the percentage reflectance to light of wavelength 570 nm, both measured in accordance with International Standard No ISO 2470. Viscosity concentration was determined as the solids concentration necessary to generate a Brookfield viscosity reading of five (5) poise.

EXAMPLE 3

Coating Colour Properties

The pigments were made down and coated onto a 36 g/m² mechanical base (reel no. 500) at 800 m/min using the short dwell time applicator on Helicoater 2000C, in a typical 100% kaolin LWC offset formulation, as shown in Table 2.

TABLE 2

Coating colour formulations

| Pigment | 1 | 2 | 3 | 4 |
|---|---|---|---|---|
| SUPRAPRINT ™ | 100 | | | |
| Composition A1 | | 100 | | |
| Composition A2 | | | 100 | |
| Composition A3 | | | | 100 |
| Dow 920 Latex | 11 | 11 | 11 | 11 |
| CMC FF10 | 0.3 | 0.3 | 0.3 | 0.3 |

Coatings were applied at the highest runnable solids, at which colour properties are shown in Table 3. Coatweights in the range 5 to 12 g/m² were applied.

TABLE 3

Coating colour properties

| Colour | Solids (%) | Brookfield Viscosity (mPa · s) | | | | Bohlin mPa · s @ 13000 sec$^{-1}$ | Eklund Water loss g/m² |
|---|---|---|---|---|---|---|---|
| | | 10 rpm | 20 rpm | 50 rpm | 100 rpm | | |
| SUPRAPRINT ™ Coating Colour | 62.2 | 2800 | 1600 | 800 | 480 | 180 | 88 |
| Coating Colour A1 | 64.2 | 3200 | 1800 | 880 | 540 | 111 | 108 |
| Coating Colour A2 | 63.7 | 3200 | 1800 | 880 | 540 | 131 | 97 |
| Coating Colour A3 | 63.7 | 3400 | 1900 | 920 | 560 | 176 | 97 |

Increasing the shape factor of the two recent batches of the coating colours made with the secondary kaolins of the present invention reduced the runnable solids of the coating colours by about 0.5%, but the solids levels was still significantly higher (1.5%) than that of the prior art primary kaolin. The Brookfield viscosity measurements of the coating colour containing secondary kaolins prepared in accordance with the present invention were similar to that of the coating colours containing prior art primary kaolin. The Bohlin number was determined using a high shear viscometer in accordance with conventional methods that should be known to one of ordinary skill in the art. Generally speaking, a lower Bohlin number is preferable for a coating colour. Thus, the inventive compositions show superior performance over the prior art primary kaolin composition when used in coating colours. Water retention properties of the coating colours prepared using the kaolins of the present invention were slightly less favourable than those prepared using the prior art primary kaolin. Thus, overall the measured parameters are quite close to the desired characteristics of the coating colours prepared using the prior art primary derived kaolin.

EXAMPLE 4

Coated Paper Properties

To further illustrate the utility of the kaolin compositions prepared in accordance with aspects of the present invention, coated paper tests were also conducted. Values interpolated to a coating thickness of 8 g/m² are given in Table 4.

TABLE 4

Paper properties interpolated to 8 g/m²

| | Pigment | | Paper | | | | |
|---|---|---|---|---|---|---|---|
| Pigment | B'ness | Shape Factor | B'ness | Opacity | PPS 10 kg | Gloss | Gurley Porosity (s) |
| SUPRAPRINT ™ | 88.4 | 35 | 71.2 | 87.3 | 0.84 | 75 | 4000 |
| Composition A1 | 89.1 | 26 | 71.6 | 87.3 | 0.82 | 79 | 4000 |
| Composition A2 | 88.6 | 31 | 71.3 | 87.2 | 0.83 | 80 | 5000 |
| Composition A3 | 89.4 | 32 | 71.6 | 87.0 | 0.83 | 80 | 5000 |

As can be seen in Table 4, the brightness, opacity and Parker Print Surf values of papers prepared using secondary kaolin compositions prepared in accordance to aspects of the present invention were all comparable to those prepared using the prior art primary kaolin composition. The porosity paper made using the inventive compositions ranged from identical to, to slightly inferior to, that of paper made using the prior art composition. The brightness and gloss achieved with the inventive compositions were superior to those achieved using the prior art primary kaolin composition.

EXAMPLE 5

Offset Printing Properties

As can be seen in Table 5, coated papers produced using the secondary kaolin derived compositions of the present invention perform remarkably similarly to the prior art primary derived kaolins with respect to their offset printing properties.

TABLE 5

Offset printing properties of ca. 8 g/m² coatweight papers

| Pigment | Print Gloss | | Delta Gloss (Dry-Paper) | Print Density | | L/D | Cyan Mottle |
|---|---|---|---|---|---|---|---|
| | Dry | Litho | | Dry | Litho | | |
| SUPRAPRINT ™ | 86 | 78 | 11 | 1.44 | 1.31 | 0.91 | Slight |
| Composition A1 | 85 | 79 | 6 | 1.43 | 1.32 | 0.92 | Slight |
| Composition A2 | 86 | 78 | 6 | 1.45 | 1.32 | 0.91 | Slight |
| Composition A3 | 86 | 78 | 6 | 1.46 | 1.32 | 0.90 | Slight |

Print gloss was measured in accordance with the gloss measurement procedures previously discussed and the delta gloss represents the change in gloss from before to after printing. The dry print density, again measured according to industry standard procedures, is determined by measuring the reflectance of white light from the sample under test and from an unprinted white sheet and applying the following formula:

$$\text{Density } (D) = \text{Log}_{10} 1/R$$

where $R = R_1 \div R_w$ and where $R_1$ is the intensity of light reflected by the sample under test and $R_w$ is the intensity of light reflected by the unprinted white sheet.

Thus, it can be seen from the above examples, that a kaolin product can be produced from a secondary kaolin in accordance with the methods of the present inventions that is a suitable substitute for the prior art kaolin products having desired properties that have been previously only derived from primary kaolins.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A pigment product comprising kaolin having a particle size distribution such that at least about 85% by weight of the particles have an equivalent spherical diameter less than about 2 μm, and from greater than 10% to about 20% by weight of the particles have an equivalent spherical diameter less than 0.25 μm, the particles have a shape factor in the range of from about 26 to about 40, and the particles have a particle steepness of greater than about 32, wherein said kaolin is derived from a crude secondary kaolin.

2. The pigment product according to claim 1, wherein said crude secondary kaolin is obtained from the Para State region of Brazil.

3. The pigment product according to claim 1, wherein from about 85% to about 95% by weight of the particles have an equivalent spherical diameter less than about 2 μm.

4. The pigment product according to claim 1, wherein from about 87% to about 93% by weight of the particles have an equivalent spherical diameter less than about 2 μm.

5. The pigment product according to claim 1, wherein from about 14% to about 18% by weight of the particles have an equivalent spherical diameter less than about 0.25 μm.

6. The pigment product according to claim 1, wherein the shape factor of the particles is in the range of from about 20 to about 36.

7. The pigment product according to claim 1, wherein the shape factor of the particles is in the range of from about 26 to about 33.

8. The pigment product according to claim 7, wherein the shape factor of the particles is in the range of from about 26 to about 30.

9. The pigment product according to claim 8, wherein the shape factor of the particles is in the range of from about 28 to about 30.

10. The pigment product according to claim 1, wherein the steepness of the particles is in the range of from about 32 to about 40.

11. The pigment product according to claim 1, wherein the steepness of the particles is in the range of from about 35 to about 39.

12. The pigment product according to claim 1, wherein the steepness of the particles is in the range from about 36 to about 38.

13. The pigment product according to claim 1, wherein said kaolin is made by a method comprising:
   (a) mixing an unfractionated kaolin clay with water to form an aqueous suspension;
   (b) combining a coarse kaolin fraction with said aqueous suspension, said coarse kaolin fraction having in the range of about 20% to about 40% by weight particles smaller than about 2 microns;
   (c) attrition grinding said aqueous suspension such that the average shape factor of the kaolin clay is increased by at least about 10;
   (d) classifying the resultant suspension of ground kaolin clay to obtain a pigment product therefrom.

14. A method of making a pigment product comprising a steep, platy kaolin having a particle size distribution such that at least about 85% by weight of the particles have an equivalent spherical diameter less than about 2 μm and from about 15% to about 20% by weight of the particles have an equivalent spherical diameter less than 0.25 μm, the particles have a shape factor in the range of from about 26 to about 36, and the particles having a particle steepness in the range of about 35 to about 40, the method comprising:
   (a) mixing an unfractionated secondary kaolin clay with water to form an aqueous suspension;
   (b) combining a coarse kaolin fraction with said aqueous suspension;
   (c) attrition grinding said aqueous suspension such that the average shape factor of the kaolin clay is increased by at least about 10;
   (d) classifying the resultant suspension of ground kaolin clay to obtain a pigment product therefrom.

15. A method according to claim 14, wherein said coarse kaolin fraction has previously been ground and classified to reduce its content of agglomerated fine kaolin particles and to partly delaminate the kaolinite stacks.

16. A method according to claim 14, wherein said coarse kaolin has been prepared by:
   (a) mixing a raw or partially processed kaolin clay with water to form an aqueous suspension;
   (b) attrition grinding said aqueous suspension;
   (d) classifying the resultant suspension of ground kaolin clay to obtain a coarse fraction therefrom.

17. A method according to claim 16, wherein said attrition grinding occurs in multiple stage.

18. A method according to claim 14, wherein in (c), the average shape factor is increased by at least about 15.

19. The method according to claim 14, wherein the aqueous suspension is further treated with a water soluble bleaching agent.

20. A coating composition for use in producing gloss coatings on paper and other substrates, wherein said composition comprises an aqueous suspension of a particulate pigment and an adhesive, wherein the particulate pigment comprises the pigment product according to claim 1.

21. A composition according to claim 20, wherein the solids content of the composition is greater than about 60% by weight of the composition.

22. A coating composition for use in producing gloss coatings on paper and other substrates, wherein said composition comprises an aqueous suspension of a particulate pigment and an adhesive, wherein at least about 80% by weight of the particulate pigment comprises the pigment product according to claim 1.

23. A composition according to claim 20, wherein the adhesive comprises a modified or unmodified starch.

24. A composition according to claim 20, wherein the adhesive comprises a binder other than starch.

25. A method of forming a gloss coating on paper, comprising coating the paper with a composition according to claim 20 and calendering the paper to form a gloss coating thereon.

* * * * *

UNITED STATES PATENT AND TRADEMARK OFFICE
CERTIFICATE OF CORRECTION

PATENT NO. : 7,597,755 B2  
APPLICATION NO. : 10/518338  
DATED : October 6, 2009  
INVENTOR(S) : David L. Light et al.

Page 1 of 1

It is certified that error appears in the above-identified patent and that said Letters Patent is hereby corrected as shown below:

Claim 5, col. 17, line 43, delete "about" before -- 0.25μm --.

Claim 17, col. 18, line 38, "stage" should read -- stages --.

Signed and Sealed this

Eighth Day of December, 2009

David J. Kappos  
*Director of the United States Patent and Trademark Office*